United States Patent [19]

Schweitzer, Jr.

[11] 3,906,477
[45] Sept. 16, 1975

[54] FAULT INDICATOR IN TEST POINT CAP

[76] Inventor: Edmund O. Schweitzer, Jr., 1002 Dundee Rd., Northbrook, Ill. 60062

[22] Filed: Sept. 6, 1974

[21] Appl. No.: 503,719

[52] U.S. Cl. .............................. 340/253 A; 324/133
[51] Int. Cl.² ........................................ G08B 21/00
[58] Field of Search ...... 340/248, 253; 324/51, 133; 317/22, 23, 48

[56] References Cited
UNITED STATES PATENTS

| | | | |
|---|---|---|---|
| 3,375,510 | 3/1968 | Pitches............................ | 340/253 A |
| 3,413,548 | 11/1968 | Schweitzer, Jr..................... | 324/133 |
| 3,480,863 | 11/1969 | Hopengarten ..................... | 324/133 |
| 3,518,544 | 6/1920 | Tachick .......................... | 324/133 X |
| 3,594,767 | 7/1971 | Link.............................. | 340/253 A |
| 3,657,650 | 4/1972 | Arndt............................. | 324/133 X |
| 3,676,740 | 7/1972 | Schweitzer, Jr..................... | 317/22 |
| 3,702,966 | 11/1972 | Schweitzer, Jr..................... | 324/133 |
| 3,736,505 | 5/1973 | Sankey............................. | 324/133 |
| 3,781,682 | 12/1973 | Schweitzer, Jr..................... | 324/133 |
| 3,816,816 | 6/1974 | Schweitzer, Jr..................... | 324/133 |

Primary Examiner—John W. Caldwell
Assistant Examiner—Daniel Myer
Attorney, Agent, or Firm—Robert R. Lockwood

[57] ABSTRACT

A plug-in connector for high voltage alternating current circuits includes a conductor embedded in insulating material with a test point terminal capacitively associated therewith together with fault responsive means mounted on the connector and having a target that is shifted to fault indicating position on flow of fault current in the conductor and is reset from the fault indicating position on restoration of energizing voltage to the conductor.

16 Claims, 4 Drawing Figures

RESET   TRIP

FAULT INDICATOR IN TEST POINT CAP

This invention relates, generally, to automatically resettable alternating current fault indicators and it has particular relation to such indicators arranged to be mounted on plug-in connectors for high voltage alternating current circuits. It constitutes an improvement over the disclosure in my U.S. Pat. No. 3,715,742, issued Feb. 6, 1973 and over the disclosures in U.S. Pat. Nos. 3,524,133, issued Aug. 11, 1970 and 3,558,984, issued Jan. 26, 1971.

Among the objects of this invention are: To provide a fault indicator in association with the test point cap of a plug-in connector employed in conjunction with high voltage alternating current circuits that is arranged to operate in a new and improved manner; to charge first and second capacitors in parallel in accordance with the voltage of the circuit for energizing trip and reset windings on a magnetic core of a fault indicator mechanism; to discharge both of the capacitors for energizing the trip winding in response to flow of fault current while preventing the discharge of one of them in energizing the reset winding; to energize the trip winding on closure of the contacts of a reed switch located in the magnetic field around a conductor that is a part of the high voltage alternating current circuit; to position the longitudinal axis of the magnetic core of the fault indicator mechanism generally perpendicular to the longitudinal axis of the conductor and the longitudinal axis of the reed switch generally parallel to the aternating magnetic field around the conductor; to employ a winding inductively related to the conductor and rectifying means for energizing the trip winding; and to employ a pivoted target in the fault indicator mechanism having operative positions about 180° apart and to bias magnetically the target to either of these position.

Figure 1:
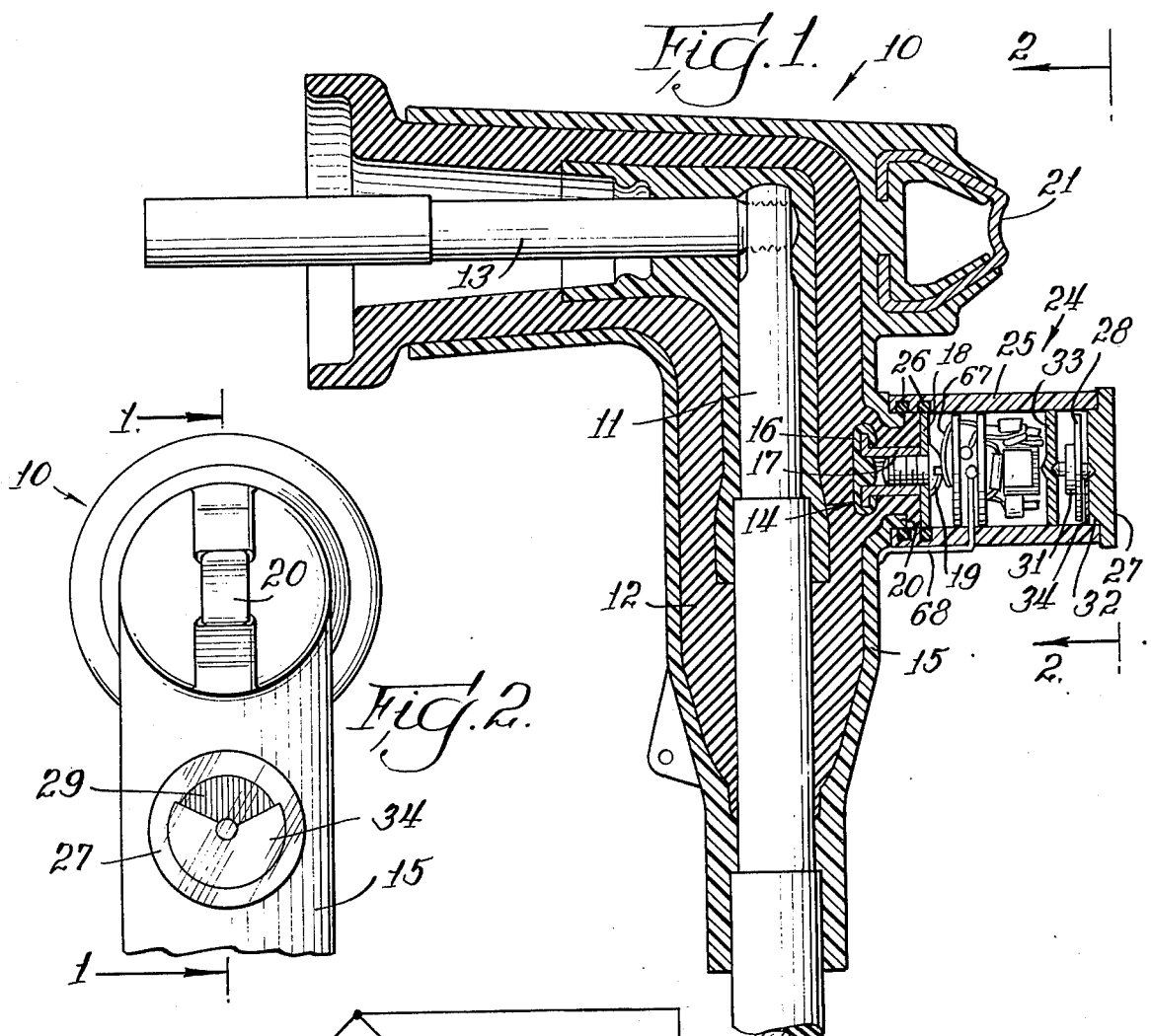
FIG. 1 is a vertical sectional view taken generally along the line 1—1 of FIG. 2 and shows a plug-in connector having mounted thereon a fault indicator mechanism in which this invention is embodied.
Figures 2, 3:
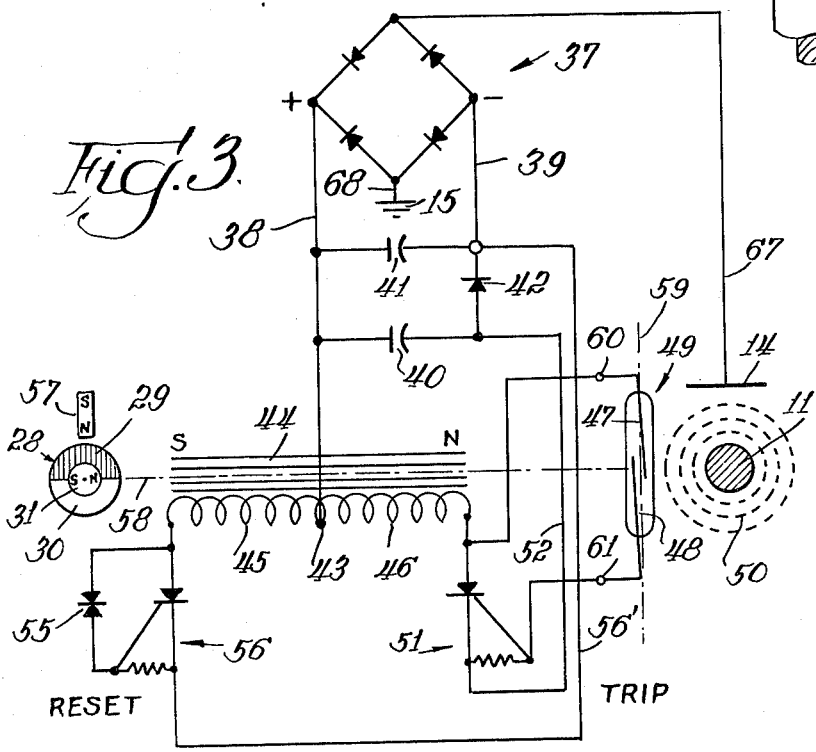
FIG. 2 is a partial elevational view of the plugin connector shown in FIG. 1 and taken looking along the line 2-2.
FIG. 3 shows diagrammatically the circuit connections for the fault indicator mechanism.

Referring now particularly to FIGS. 1 and 2, it will be observed that the reference character 10 designates, generally, a plug-in connector of conventional construction. It includes a conductor 11 that is embedded in insulating material 12, the conductor 11 being arranged to be part of a high voltage electric power distribution circuit engergized, for example, at a voltage of 14Kv. Extending from the conductor 11 is a plug-in conductor 13 that is arranged to be connected to a terminal of a device such as a power transformer.

Embedded in the insulating material 12 is a test point terminal that is indicated, generally, at 14. The test point terminal 14 is capacitively connected between the conductor 11 and a conductive coating 15 surrounding the insulating material 12, the conductive coating being grounded in accordance with conventional practice. The test point terminal 14 includes a terminal plate 16 that is secured to a threaded sleeve 17. A non-magnetic metallic washer 18 overlies the outer end of the sleeve 17 and is secured thereto by a screw 19. Formed integrally with the conductive coating 15 is an outstanding flange 20.

In accordance with conventional practice normally a test cap is telescoped over the outstanding flange 20. When it is removed, access can be had to the screw 19 forming a part of the test point terminal 14. An indicating device then can be connected to determine whether the conductor 11 is energized.

The plug-in connector 10 is arranged to be manipulated by a hook stick. For this purpose an eye 21 is embedded in the conductive coating 15 to receive the prong of the hook stick for either withdrawing the plug-in connector 10 or applying it to a transformer terminal or the like.

In accordance with this invention there is provided a fault indicator mechanism which is indicated, generally, at 24. It includes an insulating housing 25 the inner end of which is telescoped over the outstanding flange 20. A sealed connection is provided by O rings 26 which are interposed between the inside of the housing 25 and the outer surfaces of the washer 18 and flange 20.

At its outer end the housing 25 is closed by transparent cover 27 through which a target disc 28 is visible. As illustrated diagrammatically in FIG. 3 the target disc 28 includes a red section 29 and a white section 30, both formed by reflecting tapes to make them more visible. Secured to the target disc 28 is an annular permanent magnet 31. The disc 28 and permanent magnet 31 are pivoted between a reduced diameter section 32 of the transparent cover 27 and a washer 33 that is suitably secured to the inside of the insulating housing 25. A mask 34 overlies a major portion of the target disc 28 in order to permit exposure of only a portion of either the red section 29 or the white section 30. The permanent magnet 31, as indicated in FIG. 3, is magnetized along a diameter with the polarities as indicated. It is illustrated here in the tripped position.

The circuit connections embodied in the fault indicator mechanism 24 are shown in detail in FIG. 3. The circuit includes a full wave rectifier 37 which is connected between the test point terminal 14 and the conductive coating 15 which is grounded. When the conductor 11 is energized and normal current flows through it the full wave rectifier 37 energizes conductors 38 and 39 to the polarities indicated. First and second capacitors 40 and 41 are connected in parallel between the conductors 38 and 39 and are commonly charged to a voltage which is derived from the charging current of the conductor 11 to ground. A blocking diode 42 is inserted in the conductor 39 between the capacitors 40 and 41 in order to permit both of them to be charged in parallel and to be discharged simultaneously for operating the fault indicator mechanism to the fault indicating position. However, only the second capacitor 41 can be discharged for resetting the fault indicator mechanism 24 to the non-indicating position.

The fault indicator mechanism 24 includes a center tapped winding 43 that surrounds a magnetic core 44. The winding 43 includes a reset section 45 and a trip section 46.

The fault indicator mechanism is illustrated in FIG. 3 in the tripped condition and it is assumed that the conductor 11 is not energized. Also it is assumed that fault current of the order of several hundred or several thousand amperes previously had flowed through the conductor 11. Accordingly trip section 46 of the winding 43 was energized on closure of contacts 47 and 48 of magnetic material in a reed switch that is indicated, generally, at 49. The reed switch 49 is positioned in the alternating magnetic field around the conductor 11 that is indicated at 50. On closure of the contacts 47 and 48 which takes place only when fault current above a pre-determined magnitude flows in the conductor 11, voltage sensitive switch means, shown generally at 51, is rendered conducting. The voltage sensitive switch means 51 preferably is an SCR. When it is rendered conducting a circuit is completed over conductor 52 which permits the discharge of both capacitors 40 and 41 through the trip section 46 of the winding 43. The magnetic core 44 then is magnetized with the polarities indicated and the annular permanent magnet 31 together with the target disc 28 is pivoted to the position shown.

It is presumed that the energizing circuit to the conductor 11 is opened by a suitable circuit breaker and that the conductor 11 then is deenergized. The target disc 28 then remains in the fault indicating position for subsequent observation.

On restoration of energizing voltage to the conductor 11 the capacitors 40 and 41 are charged. When the charge on capacitor 41 reaches a value such as to cause a trigger diode 55 to break down, voltage sensitive switch means, shown generally at 56 and preferably comprising an SCR, is rendered conducting. A circuit then is completed over conductor 56' to the second capacitor 41. Current then flows through the reset section 45 of the winding 43 in a direction opposite to the direction in which current previously flowed through the trip section 46. As a result the polarities of the magnetic core 44 are reversed and the target disc 28 and permanent magnet 31 are pivoted through 180° to a non-indicating position where the white section 30 only is visible through the transparent cover 27.

It will be understood that the annular permanent magnet 31 is capable of pivotal movement in either direction through 180°. It is desirable that the creation of a dead-center condition be avoided with respect to the low coercive force core 44 when its polarity is reversed. Accordingly, a stationary permanent magnet 57 is located midway between the alternate positions of the permanent magnet 31 to provide off-center torque, thereby preventing the development of a dead-center condition.

The physical locations of the magnetic core 44 and reed switch 49 are important. The longitudinal axis 58 of the magnetic core 44, which preferably is formed of low coercive force magnetic material, is perpendicular to the alternating magnetic field 50 around the conductor 11. The reason for this is to avoid demagnetization of the core 44. The longitudinal axis 59 of the reed switch 49 is located generally parallel to the magnetic field 50 around the conductor 11. The reason for this is to effect closure of the contacts 47 and 48 only when the current in the conductor 11 exceeds a predetermined value which is above the normal load current carrying capacity of the conductor 11.

Figure 4:
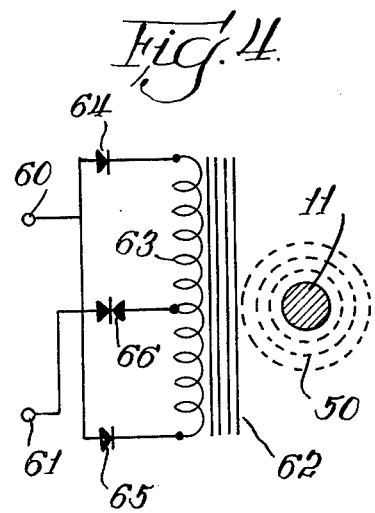
FIG. 4 shows diagrammatically an alternate current responsive circuit that can be employed.

It will be observed that the contacts 47 and 48 of the reed switch 49 are connected to terminals 60 and 61 for controlling the conductivity of the voltage sensitive switch means 51. FIG. 4 shows an alternate arrangement that can be employed in lieu of the reed switch 49. As here illustrated there is provided a magnetic core 62 which may surround the conductor 11 and into which the alternating magnetic field 50 is induced to induce a current flow in a winding 63 that corresponds to the current flow in the conductor 11. Rectifiers 64 and 65 are connected to the ends of the winding 63 to provide a full wave rectifier effect. When fault current flows in the conductor 11, sufficient current is induced in winding 63 to generate a voltage high enough to render a trigger diode 66 conducting. As illustrated the circuit is connected to the terminals 60 and 61 to the end that the voltage sensitive trigger switch means 51 is rendered conducting on the occurrence of flow of fault current in the conductor 11.

As pointed out hereinbefore when the voltage sensitive switch means 51 is rendered conducting both the first and the second capacitors 40 and 41 are discharged to energize trip section 46 of the winding 43. Because of the provision of the blocking diode 42 at least the charge on the first capacitor 40 always is available for energizing the trip section 46 to indicate a fault condition and is not subject to voltage loss on the second capacitor 41 after a reset pulse. It is desirable that energy always be available for energizing the trip section 46 on the occurrence of a fault. On restoration of energizing voltage to the conductor 11 and normal current flow therein a number of cycles of the alternating current may be required to recharge the second capacitor 41 to an extent sufficient to break down trigger diode 55 and render the voltage sensitive switch means 56 conducting for resetting the fault indicator mechanism 24 to the non-indicating position.

The circuit elements and circuit connections shown in FIG. 3 and contained within the housing 25 are detachably connected to the test point terminal 14 by a spring clip 67 which is arranged to bear resiliently against the head of the screw 19. The circuit to the conductive coating 15 or ground is completed by a conductor 68 that extends through the housing 25.

I claim:

1. Means responsive to flow of alternating fault current in and high voltage energization of a conductor comprising: means for responding to current flow in said conductor, first and second capacitor means, rectifier means, conductive circuit means for directly interconnecting said first and second capacitor means in parallel and said conductor through said rectifier means to charge said first and second capacitor means to a unidirectional voltage, and fault indicating means including: a target, a magnetic core, a trip winding on said core connected to be energized from said first capacitor means in response to operation of said current flow responsive means for moving said target from a non-indicating position to a fault indicating position in response to flow of fault current in said conductor, and a reset winding on said magnetic core connected to be energized from said second capacitor means for moving said target from said fault indicating position to said non-indicating position on application of energizing voltage to said conductor.

2. Current and voltage responsive means according to claim 1 whererein a blocking diode is interposed between said first and second capacitor means in such direction as to effect simultaneous discharge of said first and second capacitor means to energize said trip winding and to prevent discharge of said first capacitor means when said reset winding is energized.

3. Current and voltage responsive means according to claim 1 wherein said means for responding to current flow in said conductor includes reed switch means positioned to be responsive to the alternating magnetic field around said conductor.

4. Current and voltage responsive means according to claim 3 wherein the longitudinal axis of said magnetic core is generally perpendicular to the longitudinal axis of said conductor and the longitudinal axis of said reed switch means is generally parallel to the alternating magnetic field around said conductor.

5. Current and voltage responsive means according to claim 1 wherein said means for responding to current flow in said conductor includes a winding inductively related thereto and rectifier means the output of which corresponds to the magnitude of said current flow in said conductor.

6. Current and voltage responsive means according to claim 1 wherein said target includes a pivoted permanent magnet arranged to occupy positions 180° apart depending upon the polarity of said magnetic core, and a permanent magnet is stationarily mounted with respect to said pivoted permanent magnet to insure that the latter occupies one or the other of its indicating positions.

7. Current and voltage responsive means according to claim 1 wherein said means for responding to current flow in said conductor includes reed switch means positioned to be responsive to the alternating magnetic field around said conductor and connected to trigger voltage sensitive means connected in series circuit relation with said trip winding.

8. Current and voltage responsive means according to claim 1 wherein said reset winding is arranged to be energized when voltage sensitive switch means connected in series circuit relation therewith is rendered conducting on application of predetermined voltage from said second capacitor means to trigger means connected across said voltage sensitive switch means.

9. In combination, a plug-in connector for high voltage alternating current circuits having: a conductor embedded in insulating material, and a test point terminal carried by said insulating material and capacitively related to said conductor; and fault responsive means carried by said connector comprising: means for responding to current flow in said conductor, capacitor means, rectifier means, circuit means interconnecting said capacitor means and said test point terminal through said rectifier means to charge said capacitor means to a unidirectional voltage; and fault indicating means including: a target, a magnetic core, a trip winding on said core connected to be energized from said capacitor means in response to operation of said current flow responsive means for moving said target from a non-indicating position to a fault indicating position in response to flow of fault current in said conductor, and a reset winding on said magnetic core connected to be energized from said capacitor means for moving said target from said fault indicating position to said non-indicating position on application of energizing voltage to said conductor.

10. The plug-in connector and fault responsive means according to claim 9 wherein said capacitor means comprises first and second capacitor means connected in parallel to said rectifier means, said first capacitor means is arranged to energize said trip winding on said flow of fault current in said conductor, and said second capacitor means is arranged to energize said reset winding on said application of energizing voltage to said conductor.

11. The plug-in connector and fault responsive means according to claim 9 wherein a blocking diode is interposed between said first and second capacitor means in such direction as to effect simultaneous discharge of said first and second capacitor means to energize said trip winding and to prevent discharge of said first capacitor means when said reset winding is energized.

12. The plug-in connector and fault responsive means according to claim 9 wherein said means for responding to current flow in said conductor includes reed switch means positioned to be responsive to the alternating magnetic field around said conductor.

13. The plug-in connector and fault responsive means according to claim 12 wherein the longitudinal axis of said magnetic core is generally perpendicular to the longitudinal axis of said conductor and the longitudinal axis of said reed switch means is generally parallel to the alternating magnetic field around said conductor.

14. The plug-in connector and fault responsive means according to claim 9 wherein said means for responding to current flow in said conductor includes a winding inductively related thereto and rectifier means the output of which corresponds to the magnitude of said current flow in said conductor.

15. The plug-in connector and fault responsive means according to claim 9 wherein said plug-in connector has an outstanding flange integral with said insulating material, and said fault responsive means is enclosed in a housing telescoped with said flange.

16. The plug-in connector and fault responsive means according to claim 15 wherein said circuit means is detachably connected to said test point terminal.

* * * * *